(12) United States Patent
Acker

(10) Patent No.: US 10,527,461 B2
(45) Date of Patent: Jan. 7, 2020

(54) DEVICE FOR MEASURING A MEASUREMENT VARIABLE

(71) Applicant: Continental Teves AG & Co. oHG, Frankfurt (DE)

(72) Inventor: Heinrich Acker, Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/740,135

(22) PCT Filed: Jul. 29, 2016

(86) PCT No.: PCT/EP2016/068156
§ 371 (c)(1),
(2) Date: Dec. 27, 2017

(87) PCT Pub. No.: WO2017/025353
PCT Pub. Date: Feb. 16, 2017

(65) Prior Publication Data
US 2018/0313669 A1    Nov. 1, 2018

(30) Foreign Application Priority Data
Aug. 11, 2015   (DE) ................. 10 2015 215 330

(51) Int. Cl.
*G01D 5/243* (2006.01)
*G01D 5/20* (2006.01)
*G01V 3/08* (2006.01)

(52) U.S. Cl.
CPC ............. *G01D 5/243* (2013.01); *G01D 5/204* (2013.01); *G01D 5/2006* (2013.01); *G01V 3/08* (2013.01)

(58) Field of Classification Search
CPC ...... G01D 5/243; G01D 5/2006; G01D 5/204; G01V 3/08
USPC ...................................... 324/217.15
See application file for complete search history.

(56) References Cited

U.S. PATENT DOCUMENTS

| | | | | |
|---|---|---|---|---|
| 2,368,052 A * | 1/1945 | Unger | .................... | H04R 19/04 331/65 |
| 2,409,876 A | 10/1946 | Martin et al. | | |
| 2,732,499 A * | 1/1956 | Bunblasky et al. | ..... | H03B 7/10 331/128 |
| 3,518,551 A * | 6/1970 | Styblo | ................ | G01R 27/2688 307/652 |

(Continued)

FOREIGN PATENT DOCUMENTS

| | | |
|---|---|---|
| CN | 1285036 A | 2/2001 |
| DE | 3102439 A1 | 8/1982 |

(Continued)

OTHER PUBLICATIONS

Lynch, A. C. "A bridge network for the precise measurement of direct capacitance." Proceedings of the IEE-Part B: Radio and Electronic Engineering 104.16 (1957): 363-366. (Year: 1957).*

(Continued)

*Primary Examiner* — Christopher P McAndrew
(74) *Attorney, Agent, or Firm* — RatnerPrestia

(57) ABSTRACT

A device for measuring a measurement variable, wherein a first inductance is replenished with a capacitance to form a parallel resonant circuit and the first inductance is coupled to a measurement inductance.

19 Claims, 2 Drawing Sheets

(56) References Cited

U.S. PATENT DOCUMENTS

| | | | | |
|---|---|---|---|---|
| 4,493,039 | A | * | 1/1985 | Gregory ................. G01N 27/82 |
| | | | | 324/228 |
| 4,856,098 | A | * | 8/1989 | Morra .............. B60G 17/01908 |
| | | | | 324/207.16 |
| 5,027,066 | A | | 6/1991 | Reder |
| 5,293,137 | A | | 3/1994 | Tavis et al. |
| 6,215,365 | B1 | * | 4/2001 | Kurkovskiy ........... H03K 3/014 |
| | | | | 324/236 |
| 6,335,619 | B1 | * | 1/2002 | Schwab ................. G01D 3/036 |
| | | | | 324/207.12 |
| 6,504,361 | B1 | | 1/2003 | Gleixner |
| 6,668,668 | B1 | * | 12/2003 | Peshkin .................. B66C 13/18 |
| | | | | 324/207.15 |
| 6,724,191 | B1 | * | 4/2004 | Larsen ..................... G01V 3/08 |
| | | | | 324/326 |
| 6,765,392 | B1 | * | 7/2004 | Jakoby ................... G01D 5/243 |
| | | | | 324/633 |
| 6,981,405 | B2 | | 1/2006 | Wimmer |
| 7,068,028 | B2 | * | 6/2006 | Reining ................. G01V 3/101 |
| | | | | 324/207.16 |
| 7,719,264 | B2 | | 5/2010 | Tiemann |
| 8,339,126 | B2 | | 12/2012 | Izak et al. |
| 8,421,446 | B2 | | 4/2013 | Straubinger et al. |
| 8,947,074 | B1 | * | 2/2015 | Youngquist .......... G01D 5/2006 |
| | | | | 324/207.16 |
| 9,995,778 | B1 | * | 6/2018 | Fiori, Jr. ............. G01R 27/2605 |
| 2004/0130318 | A1 | * | 7/2004 | Saltsov .................. G01D 5/204 |
| | | | | 324/207.17 |
| 2009/0039873 | A1 | * | 2/2009 | Kirchdoerffer ...... G01D 5/2046 |
| | | | | 324/207.16 |
| 2009/0102463 | A1 | * | 4/2009 | May ..................... G01D 5/2013 |
| | | | | 324/207.16 |
| 2010/0271012 | A1 | * | 10/2010 | Patterson ............... G01B 7/004 |
| | | | | 324/207.15 |
| 2013/0257434 | A1 | * | 10/2013 | Edwards .................... F16L 1/11 |
| | | | | 324/326 |
| 2014/0031607 | A1 | * | 1/2014 | Zilbershlag ........... A61M 1/127 |
| | | | | 600/16 |
| 2014/0139217 | A1 | * | 5/2014 | Vaysse ................... G01D 5/204 |
| | | | | 324/318 |
| 2014/0218726 | A1 | * | 8/2014 | Cheng .................... G01N 21/65 |
| | | | | 356/301 |
| 2014/0306807 | A1 | * | 10/2014 | Rowland .................. H04Q 9/00 |
| | | | | 340/10.3 |

FOREIGN PATENT DOCUMENTS

| | | |
|---|---|---|
| DE | 4120806 A1 | 1/1993 |
| DE | 4330140 A1 | 3/1995 |
| DE | 3903278 C2 | 9/1995 |
| DE | 19710591 A1 | 9/1998 |
| DE | 10127990 A1 | 12/2002 |
| DE | 60029113 T2 | 12/2006 |
| DE | 102006026543 A1 | 12/2007 |
| DE | 102006046531 A1 | 4/2008 |
| DE | 102008015837 A1 | 10/2009 |
| DE | 102009027997 A1 | 1/2011 |
| GB | 665630 | 1/1952 |
| GB | 2257528 A | 1/1993 |
| WO | 2013157979 A1 | 10/2013 |

OTHER PUBLICATIONS

German Search Report for German Application No. 10 2015 215 330.4, dated Nov. 28, 2016 with partial translation, 13 pages.
International Search Report and Written Opinion for International Application No. PCT/EP2016/068156, dated Nov. 16, 2016—9 Pages.

* cited by examiner

DEVICE FOR MEASURING A MEASUREMENT VARIABLE

CROSS REFERENCE TO RELATED APPLICATIONS

This application is the U.S. National Phase Application of PCT International Application No. PCT/EP2016/068156, filed Jul. 29, 2016, which claims priority to German Patent Application No. 10 2015 215 330.4, filed Aug. 11, 2015, the contents of such applications being incorporated by reference herein.

FIELD OF THE INVENTION

The invention relates to a device for measuring a measurable quantity. In particular, said device may be an inductive sensor.

BACKGROUND OF THE INVENTION

Inductive sensors are based typically on an alteration of one or more characteristic values of a system of one or more inductive components by virtue of a measurable quantity. Inductive components of such a type may include, for instance, coil, winding or inductor.

The following enter into consideration in particular as characteristic values:
  self-inductance L, also called inductance for short,
  loss resistance R, which is composed of an ohmic resistance of the winding and other loss contributions,
  complex impedance $Z=j\omega L+R$ with the imaginary unit j and with the angular frequency $\omega$,
  loss angle $\delta=\arctan(\text{Re}\{Z\}/\text{Im}\{Z\})$,
  and also, particularly in the case of magnetic coupling between several components, mutual inductance M. The mutual inductance M can, amongst other things, be measured indirectly as induced voltage in one conductor as a response to a known current in another conductor.

Measurable quantities that bring about the alteration of the characteristic values may be, amongst other things, position or length, angle, force, pressure or torque. By way of application, a position sensor for the brake pedal of an automobile may be mentioned in exemplary manner.

For inductive sensors, two main approaches in terms of circuit engineering exist, in particular, in the state of the art in order to undertake an electrical measurement of the characteristic values:

One approach is a resonant system. The inductive sensor with its variable characteristic value, usually the inductance L, is part of the frequency-determining network of an oscillator. The oscillator always oscillates at its natural frequency, the most important influencing factor of which is L. The measurement of L has consequently been reduced to a frequency measurement which, for example, can be easily undertaken by counting the periods or zero crossings of the oscillation of the oscillator.

The other approach is a lock-in amplifier (also phase-sensitive rectifier, synchronous demodulator or carrier-frequency amplifier). The inductive sensor receives a stimulus having a fixed frequency (current or voltage). A signal-processing circuit measures the respective other electrical quantity on the basis of the impedance (voltage or current). The processing of the signal corresponds to a narrowband filtering of this quantity around the frequency of the stimulus with subsequent determination of the complex amplitude and formation of a quotient with the stimulus for the purpose of determining the characteristic value. These functions can optionally be realized with analog electronics or largely with the means of digital signal processing and software.

Both approaches have varying disadvantages.

The resonant system has limitations in connection with the layout of the inductive system, because only one oscillation per oscillator is possible. Several signals can be obtained only with several independent oscillators and inductive systems, as a result of which the effort for sensors with ratiometric or differential measurement is distinctly increased. Furthermore, the inductive system always exhibits frequency dependencies—that is to say, it can only be optimally designed for one frequency; the frequency range of the oscillator is always a compromise. Via the change of the oscillation frequency, cross-sensitivities may falsify the result of measurement, because, for instance, in addition to the sensitivity to the measurable quantity, the inductance L is influenced by a further frequency-dependent quantity. Finally, the difference between the maximal and the minimal counting result of the frequency measurement has to exceed a minimum value, in order that the respective requirements with respect to measurement accuracy and resolution are achieved. Depending upon the frequency, a minimal measuring-time is required for this, which under certain circumstances is simply not available.

The lock-in amplifier, on the other hand, operates at a constant frequency but also requires a stimulus at this frequency. The frequency of these forced oscillations can be chosen freely, but by reason of the frequency dependence of the inductive system this constitutes a contradiction to operation in resonance—that is to say, with oscillations at the natural frequency. Therefore the following advantages of resonance cannot be utilized. The inductive system, operated as a resonator, already constitutes a filter, in that at its natural frequency it is able to achieve a particularly high amplitude which facilitates the measurement. Interferences having a frequency that deviates distinctly from this frequency are suppressed by the filter action. Furthermore, in resonance the power requirement of the inductive system for maintaining the oscillation is lowest, if all other parameters remain the same. At a given power of the stimulus, a particularly high amplitude is consequently possible. Of course, these two advantages represent the same state of affairs, in one case from the point of view of the measurement, and in the other case from the point of view of the stimulus.

SUMMARY OF THE INVENTION

It is therefore an aspect of the invention to make available an alternative device for measuring a measurable quantity, which, in particular, is improved in comparison with the state of the art.

An aspect of the invention relates to a device for measuring a measurable quantity. The device exhibits a first inductor. It exhibits a measuring inductor which is designed for sensing the measurable quantity and which is coupled with the first inductor. It further exhibits a capacitor which is connected up to the first inductor to form a parallel oscillating circuit.

The device exhibits an excitation circuit which is designed to excite the parallel oscillating circuit to oscillate with an excitation frequency. In addition, it exhibits a measuring circuit which is connected at least to the measuring inductor for the purpose of measuring a value indicating the measurable quantity.

By means of the device according to an aspect of the invention, the measurable inductance in an oscillating circuit can be measured. This saves energy, since the oscillating circuit oscillates on its own and, as a rule, only lost energy is tracked. Accordingly, a forced oscillation takes place. This allows an exploitation of the advantages of resonance, and is free from the limitations of a resonant system considered above.

The excitation circuit and/or the measuring circuit may, for instance, be implemented as electronic or electrical components, as microprocessors, microcontrollers, as application-specific integrated circuits or in some other way.

In particular, the following enter into consideration as value indicating the measurable quantity:
self-inductance L, also called inductance for short,
loss resistance R, which is composed of an ohmic resistance of the winding and other loss contributions,
complex impedance $Z=j\omega L+R$ with the imaginary unit j and with the angular frequency $\omega$,
loss angle $\delta=\arctan(\operatorname{Re}\{Z\}/\operatorname{Im}\{Z\})$,
and also, particularly in the case of a magnetic coupling between several components, mutual inductance M. The mutual inductance M can, amongst other things, be measured indirectly as induced voltage in one conductor as a reaction to a known current in another conductor.

The measurable quantity can typically be inferred from the value indicating the measurable quantity; for instance, the measurable quantity can be calculated or looked up in a table.

According to a preferred version, the invention provides that the excitation frequency differs by a maximum of 25%, preferably a maximum of 20%, particularly preferably a maximum of 15%, still more preferably a maximum of 10%, from a resonant frequency of the parallel oscillating circuit. Hence an advantageous excitation is achieved. Operation at resonant frequency is typically not intended but can normally be tolerated as a limiting case.

The excitation frequency is preferably adjustable. In particular, it can be controlled by an element having variable frequency. Such an element may be, for instance, a controllable oscillator. The excitation frequency may, for instance, also be adjustable by means of software. This allows a modulation of the excitation frequency or of the stimulus. Alternatively, the excitation frequency may also have been predetermined to be fixed.

The excitation circuit may preferentially be designed to supply the excitation frequency to the measuring circuit. Hence the excitation frequency can be used in the measuring circuit for the purpose of better reconstruction of the desired signal.

The measuring circuit may, in particular, take the form of a lock-in amplifier. The latter may also be designated as a phase-sensitive rectifier, synchronous demodulator or carrier-frequency amplifier, and has proved to be advantageous for the application that is relevant here.

The first inductor, the measuring inductor and/or the capacitor are preferably components with a respective tolerance between 1% and 10%, preferably of 1%, or of less than 1%. The tolerance typically predetermines the maximal deviation, due to the design specification, from a nominal value. Correspondingly low tolerances in the present case facilitate the basic design of the device, particularly in the context of mass production, since in the case of a low tolerance the maximal deviation of the resonant frequency of the parallel oscillating circuit is also correspondingly low.

According to one version, the measuring inductor is galvanically coupled with the first inductor. According to a further version, the measuring inductor is magnetically coupled with the first inductor. The measuring inductor may, in particular, be coupled with the first inductor by taking the form of a measuring transducer. Versions of such a type have proved to be advantageous for typical applications.

According to a preferred version, the invention provides that
the parallel oscillating circuit exhibits a maximal quality factor which is obtained by maximizing a value of Vt*Vt/V0,
where Vt denotes a ratio of coil current and feed-line current at maximal deviation of the capacitance and of the first inductance from their respective values at the resonant frequency of the parallel oscillating circuit, and
where V0 denotes a ratio of coil current and feed-line current at respective values of capacitance and first inductance at the resonant frequency of the parallel oscillating circuit.

The maximal quality factor can be limited, in particular, by connecting up a resistor in the parallel oscillating circuit.

The maximal deviation is typically predetermined by the tolerance—that is to say, the maximal deviation, already mentioned above, from the nominal value—of the respective component.

A few remarks relating to the quality factor and relating to the advantageous version just mentioned will be given below.

Passive components of electrical engineering—such as, for example, coils and capacitors—are ordinarily offered for sale with tolerances of their characteristic values which typically lie between 1% and 10%. Even lower values than 1% usually result in very high costs of the components. In contrast, tolerances of more than 10% make it difficult to design circuits in any meaningful way. If an oscillating circuit is constructed from components subject to tolerances having the characteristic values L and C (capacitance), then $\omega_0=1/\sqrt{(LC)}$ results from the oscillation formula for the resonant frequency, so that the tolerance of the resonant frequency $\omega_0$ corresponds to the geometric mean $\sqrt{(LC)}$ of the tolerances of the components. The tolerance of the resonant frequency of oscillating circuits that are constructed with the usual components therefore likewise ranges from 1% to 10%. If an oscillating circuit is designed in such a way that its nominal resonant frequency coincides with the frequency of the stimulus—that is to say, of the excitation frequency—it has to be assumed that the real resonant frequency deviates by ±1% to ±10%.

An important property of oscillating circuits is their quality factor Q. This is a measure of the losses that arise by virtue of the ohmic resistance in the circuit, and of the decay of a free oscillation. The higher the quality factor, the lower the losses and the slower the decay.

FIG. 1 shows a family of curves that shows the effect of the quality factor on the benefit of supplementing the inductive system to form the oscillating circuit in relation to the stimulus—that is to say, the excitation by the excitation circuit. Plotted is the ratio of the current $I_L$ by virtue of the excited inductor to the current $I_{St}$ of the stimulus. Without supplementing the inductive system to form the oscillating circuit, this ratio would always be equal to one, because there is no further current path. Since current $I_L$ corresponds to the useful current, because the magnetic flux is generated by it, whereas current $I_{St}$ corresponds to the complexity, the plotted quotient signifies an evaluation factor for the benefit.

Values greater than one correspond to a gain. This benefit has been plotted over the angular frequency ω normalized to the resonant-circuit frequency $\omega_0$. The family parameter is the quality factor; the value at $\omega_0$ in each curve corresponds to the value of the quality factor—that is to say, the curves represent the quality factor Q with the values 8; 6; 4; 2; 1; $1/\sqrt{2}$ (from top to bottom).

If one now considers the benefit of supplementing the inductive system to form the oscillating circuit at frequencies that deviate from the resonant-circuit frequency $\omega_0$ by, for instance, ±10%, it can be established that a high benefit may arise also for these frequencies, not only at the nominal frequency. However, the higher the quality factor, the higher the ratio of the benefit at the resonant-circuit frequency $\omega_0$ and the benefit at a frequency that deviates by ±10%. The reason is the known relationship that the bandwidth of the resonance elevation becomes ever narrower with increasing quality factor. For the design of the device described herein, the following conflict of objectives therefore exists. On the one hand, the quality factor should be as high as possible for a quality-determined benefit that is as high as possible; on the other hand, a high ratio of the benefit in the center (resonance) and at the margins of the range of tolerance brings about a reduction of usability, which is explained as follows. Any conventional measuring system, whether analog or digital, has a maximal input amplitude, which typically must not be exceeded. Within the bounds of this maximum, the relative resolution is proportional to the input signal, because the smallest discernible step of the input signal within the input-signal range is constant. Now if the input-signal range in the case of resonance is fully exhausted, the benefit resulting from FIG. 1 can also be fully utilized. However, at the margins of the range of tolerance the benefit has been reduced by the factor that results from the ratio of the benefit in the center (resonance) and at the margins of the range of tolerance.

The aim is an optimal design of the sensor system within the bounds of the layout. First of all, the aim is to keep the tolerance of the component characteristic values L and C—or, to be more exact, their geometric mean $\sqrt{(LC)}$—as low as possible. In this regard it is helpful that in recent years capacitors having tolerances of 1% and better have become available and cheaper. But the main significance for the optimization attaches to the optimal choice of the quality factor. Generally, high quality-factor values can be utilized advantageously only in combination with low tolerances of the term $\sqrt{(LC)}$. The design method described in the following is therefore based on the idea of establishing a tolerance for $\sqrt{(LC)}$ on the basis of the availability of suitable, narrowly toleranced capacitors and on the basis of the layout of an inductive system for the respective application, from which the optimal quality factor can then be calculated.

With the tolerance of $\sqrt{(LC)}$, the tolerance of the angular frequency co has also been determined by the oscillation formula. From FIG. 1, the value for $I_L/I_{St}$ can now be read off for $\omega_0$ (resonance) and $\omega_T$ (angular frequency given by the tolerance; the lower frequency limit, the upper limit or both may be chosen). This can also be done numerically; the calculation of FIG. 1 from the feed-line current $I_{St}$ and from the coil current $I_L$ for a parallel oscillating circuit of given quality factor is elementary electrical engineering and is taken for granted here. As a result, the quantities $V0 = I_L(\omega_0)/I_{St}(\omega_0)$ and $Vt = I_L(\omega_T)/I_{St}(\omega_T)$ are now known. For a frequency $\omega_T$, it then holds that the fraction with which the input-voltage range of the measuring system is exhausted is given by the term Vt/V0. At this frequency, the benefit that is obtained by supplementing the inductive signal to form the oscillating circuit is equal to Vt. Consequently, the factor by which the entire system profits from supplementing the inductive signal to form the oscillating circuit amounts to the product of the two terms: $Vt^2/V0$. By elementary transformations of the underlying equations, this factor can be calculated as a function of $\omega_0$, $\omega_T$ and Q. The optimization of a system then consists in maximizing $Vt^2/V0$, as a result of which a result for Q arises as a function of $\omega_0$ and $\omega_T$. By further elementary mathematical transformations, Q can also be plotted as a function of $\omega_0$ and $\omega_T$. From such a representation, Q can be read off directly, and in this way the repeated substituting of values for Q into the calculation for finding the maximum is obviated. In both cases, the results for Q are always maximal values—that is to say, for an appropriately designed system with $\omega_0$ and $\omega_T$, Q will never exceed the calculated values, because otherwise the underlying input-signal range of the measuring system will be violated. In the case where the calculated value of Q is fallen short of, no violation arises; the input-signal range of the measuring system is merely not exhausted. This is important for the design of the oscillating circuit, since too high a quality factor Q can always be reduced in straightforward manner by adding an ohmic resistance; under certain circumstances, however, structurally increasing a low quality factor Q given by the properties of the inductive system causes great difficulties. The cause is the parasitic character of the loss resistance in inductive components, which is often high, particularly in sensor inductors, because their windings are extended and the magnetic circuits are open.

Overall, the following advantageous procedure or the following method results, summarized from the above explanatory remarks:

1. Design of the inductive system (largely outside the subject of this application)
2. Establishment of the working frequency of the inductive system (largely outside the subject of this application, as it is determined by the design)
3. Selection of a capacitor having the lowest possible tolerance (this can be done, in particular, in accordance with commercial criteria)
4. Calculation of the geometric mean of the tolerance of the component values L and C
5. Determination of the frequency $\omega_T$ from (4.)
6. Repeated calculation and maximization of $Vt^2/V0$; the result is the maximally permissible quality factor Q with the chosen parameters
7. Is the quality factor of the oscillating circuit consisting of L, C and its structurally determined loss resistance less than the maximally permissible quality factor Q? If yes, finished.
8. If no, insert a resistor into the oscillating circuit that reduces the quality factor to the maximally permissible value.

It should be understood that the method steps just described, as a whole or in any subcombination, may represent an independent aspect of the invention.

From these remarks, in particular the procedure described above in connection with the determination of the quality factor can be derived.

The measurable quantity can, for instance, be sensed by changing a position of a magnetic core in the measuring inductor. This may alter the value of the inductance of the measuring inductor.

The measurable quantity can also be sensed by changing a spacing between the measuring inductor and the first inductor. This typically corresponds to a realization as a measuring transducer, in which case the magnetic coupling is changed.

In addition, the measurable quantity can, for instance, be sensed by changing a position of a magnetic and conductive element, of a non-magnetic and conductive element, or of a magnetic and non-conductive element adjacent to the measuring inductor and the first inductor. This allows an adaptation to different tasks and situations. The element may, for instance, be arranged between or even alongside the first inductor and the measuring inductor. As a result of the changing of the position of said element, the coupling between the first inductor and the measuring inductor is changed.

A magnetic and conductive element may be made of steel, for instance. A non-magnetic and conductive element may be made of aluminum, for instance. A magnetic and non-conductive element may be made of ferrite, for instance.

The measuring inductor may in particular be designed to sense a measurable quantity in the form of a position, a length, an angle, a force, a pressure and/or a torque. This corresponds to typical application scenarios.

The measuring circuit is preferentially designed to measure one or more of the following characteristic values via the measuring inductor:
  self-inductance or inductance,
  loss resistance,
  complex impedance,
  loss angle,
  mutual inductance relative to the first inductor.

The measurable quantity can typically be inferred from such characteristic values.

According to a further development, the invention provides that the device exhibits two, three or more than three measuring inductors. These may be designed to be movable, for instance individually or together. They may, in particular, be influenced by the same measurable quantity, so that a compensation of disturbance variables, in particular of the temperature, is possible.

In particular, the device may exhibit a first measuring inductor and a second measuring inductor, the first measuring inductor being arranged at a first longitudinal end of the first inductor, and the second measuring inductor being arranged at a second longitudinal end of the first inductor. Such a version has proved to be advantageous for typical applications.

The device according to the invention may exhibit, for instance, an oscillator, an optional amplifier, an inductive system, an oscillating-circuit capacitor, an optional measuring amplifier and a measuring system, in particular the measuring device. The amplifier amplifies the signal of the oscillator; it may, in particular, be dispensed with if the output of the oscillator already provides a sufficiently strong signal. This signal, or that of the amplifier, constitutes the stimulus for the inductive system which is supplemented by the capacitor to form the oscillating circuit. In particular, the first inductor already mentioned above and the likewise already mentioned measuring inductor may be regarded as an inductive system. If the output signal is too weak for the measuring system, an additional measuring amplifier can be used; otherwise, in particular, the measuring system can be directly connected to the inductive system, for instance by one or more electrical quantities being picked up on the inductive system. The measuring system may be realized, for instance, as a lock-in amplifier (or phase-sensitive rectifier, synchronous demodulator or carrier-frequency amplifier) implemented using analog or digital technology and, where appropriate, software, and may ascertain one or more characteristic values of the inductive system with the aid of the oscillator signal as reference signal.

By virtue of the described design of an inductive system and of a combination of the components described herein, it is ensured that the elevation of the quantities that are crucial for the measurement, as is characteristic of resonance, can be connected in conjunction with a signal-processing path as known from the lock-in amplifier. As a result, the current requirement of an inductive sensor system is reduced, and/or its measurement resolution is increased. For the practical design of inductive sensor systems with open magnetic circuits, typical values within the range from 3 to 8 for $Vt^2/V0$ can advantageously be used or expected.

BRIEF DESCRIPTION OF THE DRAWINGS

Further features and advantages will be gathered by a person skilled in the art from the embodiment described below with reference to the appended drawing.

DETAILED DESCRIPTION OF THE PREFERRED EMBODIMENTS

Figure 1:
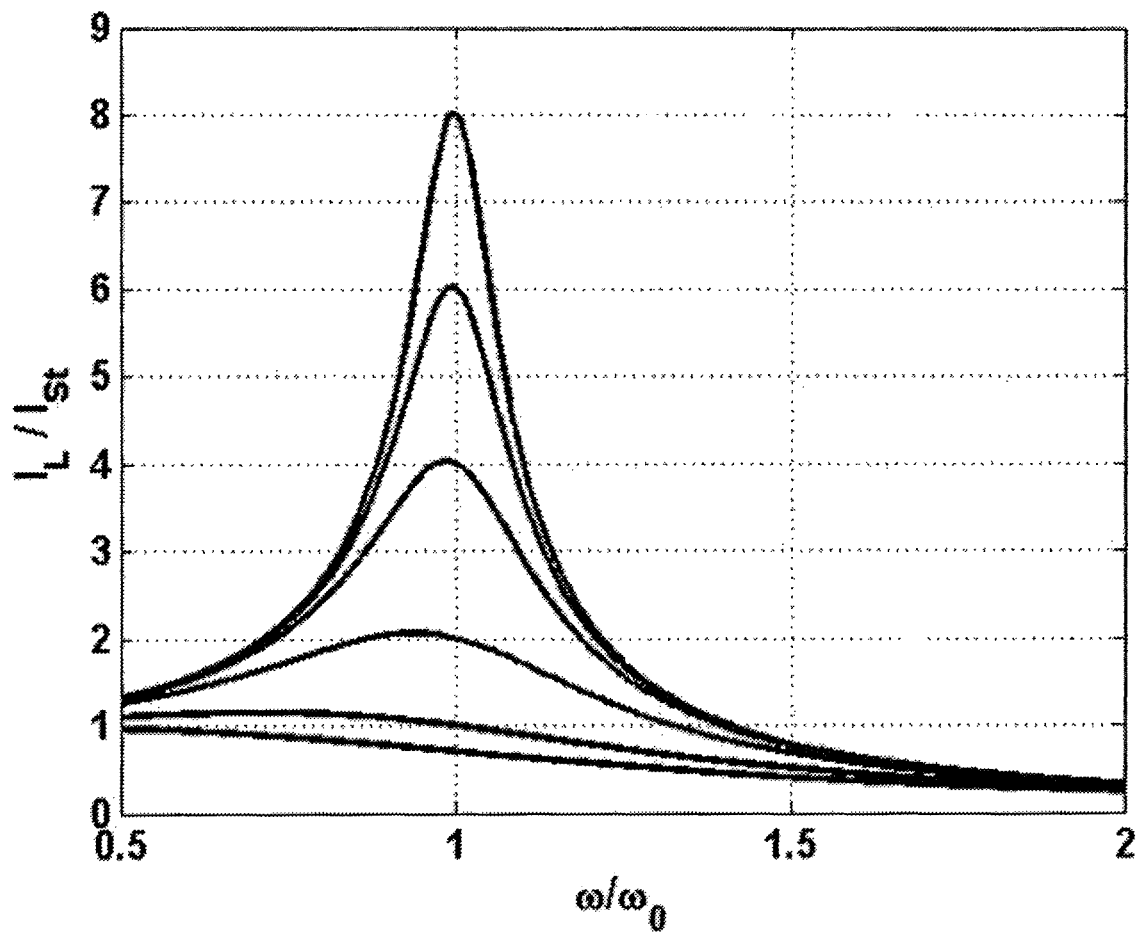
FIG. 1 shows exemplary progressions of a quality factor, which have already been considered above in this application.

FIG. 1 has already been mentioned and elucidated in the text further above.

Figure 2:
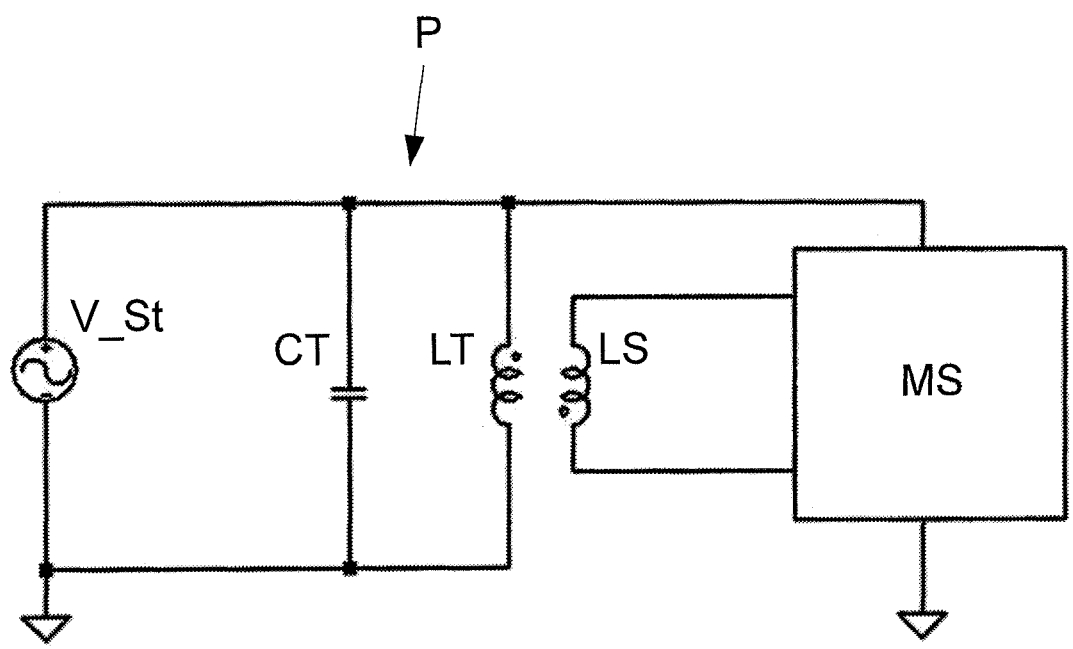
FIG. 2 shows an embodiment of a device according to an aspect of the invention.

FIG. 2 shows an embodiment of a device according to the invention for measuring a measurable quantity, in which an inductive system is realized as a measuring transducer consisting of a first inductor LT and a measuring inductor LS.

The first inductor LT is connected up to a capacitor CT to form a parallel oscillating circuit P.

In the present case, the design of the device is such that the use of an amplifier can be dispensed with. In the present case it is also not necessary to insert an additional ohmic resistance for the purpose of reducing the quality factor Q of the parallel oscillating circuit P, because the parasitic resistance of the first inductor LT is sufficient to keep the quality factor Q within the permissible range.

For the purpose of exciting the parallel oscillating circuit P, an excitation circuit is provided in the form of a voltage source V_St which contains an oscillator. V_St therefore oscillates with an excitation frequency or a working frequency and with a fixed amplitude. The current through the voltage source V_St is the actual stimulus of the parallel oscillating circuit P. The value of this current depends on the impedance of the linked parallel oscillating circuit P consisting of the capacitor CT and the first inductor LT. In the case of a high quality factor of this oscillating circuit, the current through the first inductor LT is much higher than the current through the voltage source V_St.

By virtue of the current that is flowing through the first inductor LT, a magnetic flux is generated which also extends to the measuring inductor LS.

The percentage of the magnetic flux of the first inductor LT that also passes through the measuring inductor LS depends on a measurable quantity. For instance, the spacing of the first inductor LT from the measuring inductor LS may be altered in order to measure it. But, for instance, a soft-magnetic core or an electrically conductive body may also be located between the first inductor LT and the measuring inductor LS, the movement of which is measured.

It should be mentioned that any arrangement that brings about an alteration of a parameter of the inductive system may be used in principle.

The magnetic flux in the measuring inductor LS typically induces a voltage which is fed to a measuring system MS. Since the measuring system MS is likewise linked to the voltage source V_St, when implemented as a lock-in amplifier it is able to measure the induced voltage in terms of magnitude and phase and thereby achieve a narrowband filtering around the excitation frequency.

By addition of further measuring inductors LS and by linking to further inputs of the measuring system MS, several independent signals can be supplied with the same stimulus—that is to say, the same excitation frequency.

The claims appertaining to the application do not constitute a waiver of the achievement of more extensive protection.

To the extent that in the course of the method it turns out that a feature or a group of features is not absolutely necessary, a formulation of at least one independent claim that no longer exhibits the feature or the group of features is already now striven for on the part of the applicant. In this connection it may be a question, for instance, of a subcombination of a claim existing on the date of filing, or of a subcombination, restricted by further features, of a claim existing on the date of filing. Such claims or combinations of features to be reformulated are to be understood as being covered by the disclosure of this application.

Attention should be drawn furthermore to the fact that configurations, features and variants of the invention that are described in the various versions or embodiments and/or that are shown in the figures can be combined arbitrarily with one another. Individual or several features can be exchanged for one another arbitrarily. Combinations of features arising out of this are to be understood as being jointly covered by the disclosure of this application.

Subordinating references in dependent claims are not to be understood as a waiver of the achievement of an autonomous, objective protection for the features of the subordinate dependent claims. These features can also be combined arbitrarily with other features.

Features that have been disclosed merely in the description, or features that have been disclosed in the description or in a claim only in connection with other features, may in principle be of independent significance essential for the invention. They may therefore also be included individually in claims for the purpose of delimitation from the state of the art.

The invention claimed is:

1. A device for measuring a measurable quantity, comprising:
   a first inductor,
   a measuring inductor which senses the measurable quantity and which is coupled with the first inductor,
   a capacitor which is connected to the first inductor to form a parallel oscillating circuit, an excitation circuit which is configured to excite the parallel oscillating circuit to oscillate with an excitation frequency that does not vary based on the measurable quantity sensed by the measuring inductor, and
   a measuring circuit which is connected at least to the measuring inductor for measuring a value indicating the measurable quantity.

2. The device as claimed in claim 1,
wherein
the excitation frequency differs by a maximum of 25%, from a resonant frequency of the parallel oscillating circuit.

3. The device as claimed in claim 1, wherein
the excitation frequency is adjustable.

4. The device as claimed in claim 1, wherein
the excitation circuit supplies the excitation frequency to the measuring circuit.

5. The device as claimed in claim 1, wherein
the measuring circuit is a lock-in amplifier.

6. The device as claimed in claim 1, wherein
the first inductor, the measuring inductor and/or the capacitor are components with a respective tolerance between 1% and 10%.

7. The device as claimed in claim 1, wherein
the measuring inductor is galvanically coupled with the first inductor.

8. The device as claimed in claim 1, wherein
the measuring inductor is magnetically coupled with the first inductor.

9. The device as claimed in claim 1, wherein
the parallel oscillating circuit exhibits a maximal quality factor which is obtained by maximizing a value of Vt*Vt/V0,
where Vt denotes a ratio of coil current and feed-line current at maximal deviation of the capacitance and of the first inductance from their respective values at the resonant frequency of the parallel oscillating circuit and
where V0 denotes a ratio of coil current and feed-line current at respective values of capacitance and first inductance at the resonant frequency of the parallel oscillating circuit.

10. The device as claimed in claim 9, wherein
the maximal quality factor is limited by connecting a resistor in the parallel oscillating circuit.

11. The device as claimed in claim 1,
wherein the measurable quantity is sensed by at least one of:
changing a position of a magnetic core in the measuring inductor,
changing a spacing between the measuring inductor and the first inductor,
changing a position of a:
   magnetic and conductive element,
   non-magnetic and conductive element, or
   magnetic and non-conductive element,
adjacent to the measuring inductor and the first inductor.

12. The device as claimed in claim 1,
wherein
the measuring inductor is configured to sense at least one of a measurable quantity in the form of a position, a length, an angle, a force, a pressure and a torque.

13. The device as claimed in claim 1,
wherein
the measuring circuit is configured to measure one or more of the following characteristic values via the measuring inductor:
a self-inductance or an inductance,
a loss resistance,
a complex impedance,
a loss angle
a mutual inductance relative to the first inductor.

14. The device as claimed in claim 1, wherein
the device comprising two, three or more than three measuring inductors.

15. The device as claimed in claim 1, wherein
the device comprising a first measuring inductor and a second measuring inductor, the first measuring inductor being arranged at a first longitudinal end of the first inductor, and the second measuring inductor being arranged at a second longitudinal end of the first inductor.

16. The device as claimed in claim 1, wherein the excitation frequency differs by at most 20% from a resonant frequency of the parallel oscillating circuit.

17. The device as claimed in claim 1, wherein the excitation frequency differs by at most 15% or by at most 10% from a resonant frequency of the parallel oscillating circuit.

18. The device as claimed in claim 1, wherein the excitation frequency is controlled by an element having variable frequency.

19. The device as claimed in claim 1, wherein the first inductor, the measuring inductor, and/or the capacitor are components with a tolerance of 1% or of less than 1%.

* * * * *